(12) United States Patent
Volokh

(10) Patent No.: US 7,322,774 B2
(45) Date of Patent: Jan. 29, 2008

(54) END MILL AND A METHOD OF OPERATING AN END MILL

(75) Inventor: Vladimir Volokh, Maalot (IL)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/611,589

(22) Filed: Dec. 15, 2006

(65) Prior Publication Data
US 2007/0160429 A1    Jul. 12, 2007

Related U.S. Application Data

(63) Continuation-in-part of application No. PCT/IL2005/000628, filed on Jun. 15, 2005.

(30) Foreign Application Priority Data
Jun. 17, 2004  (IL) ..................... 162587

(51) Int. Cl.
  *B23C 5/10* (2006.01)
(52) U.S. Cl. .............. 407/53; 407/60; 407/63
(58) Field of Classification Search ......... 407/53, 407/54, 60, 61, 63
See application file for complete search history.

(56) References Cited

U.S. PATENT DOCUMENTS

| | | | | |
|---|---|---|---|---|
| 4,560,308 A * | 12/1985 | Deller | | 407/53 |
| 4,810,136 A * | 3/1989 | Paige | | 407/54 |
| 6,164,876 A * | 12/2000 | Cordovano | | 407/59 |
| 6,368,030 B1 * | 4/2002 | Sato et al. | | 407/53 |
| 7,186,063 B2 * | 3/2007 | Volokh | | 407/54 |
| 7,223,053 B2 * | 5/2007 | Flynn | | 407/53 |

* cited by examiner

*Primary Examiner*—Willmon Fridie, Jr.
(74) *Attorney, Agent, or Firm*—Nils H. Ljungman & Associates

(57) ABSTRACT

An end mill for cutting or milling objects and a method of operation thereof. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 5 Drawing Sheets

END MILL AND A METHOD OF OPERATING AN END MILL

CONTINUING APPLICATION DATA

This application is a Continuation-In-Part application of International Patent Application No. PCT/IL2005/000628, filed on Jun. 15, 2005, which claims priority from Israeli Patent Application No. 162587, filed on Jun. 17, 2004. International Patent Application No. PCT/IL2005/000628 was pending as of the filing date of this application. The United States was an elected state in International Patent Application No. PCT/IL2005/000628.

BACKGROUND

1. Technical Field

This application relates to tools, such as end mills, for the milling of materials. This application further relates to at least one possible embodiment that provides improved torsional and bending rigidity of a tool's body in an end mill, thereby to extend tool life while making possible machining at increased metal removal rates, and better surface quality, while minimizing vibration.

2. Background Information

End mills are widely used in milling operations due to their versatile range of application and due to the moderate first cost of the tool. End mills are often of cylindrical shape, and are generally available up to about 80 mm diameter. Many end mills have flat ends; however other shapes such as conical and rounded ends are also used. An end mill typically has 2 to 10 teeth, depending on diameter, size and whether configured for rough cutting or finishing. The teeth are usually spiral shaped, but can be straight and parallel to the longitudinal axis. Common materials used in the construction of end mills are high speed steel, solid carbide, cermets or ceramic, or combinations thereof.

In the following text the words "end mill" refer to a cutter made of steel, or of solid carbide, or of hard ceramic materials or combinations thereof, whether the cutter is plated with a hard coating or not.

Torsional and bending rigidity are highly desirable properties in an end mill, particularly for roughing, finishing and super finishing.

During rough machining much material is removed, and the removal of chips from the cutting area requires adequate space between cutting teeth. Such space can only be provided when the number of teeth is low, typically 2-4 teeth depending on cutter diameter, and the core diameter of the tool is small, although still large enough to prevent tool breakage. The smaller core diameter may lead to minor loss of accuracy due to tool bending under pressure, but this is of little concern for roughing operations.

In choosing an appropriate core diameter, there is always a need to balance the requirements of chip clearance and coolant access on the one hand, which call for a small core diameter, and on the other hand the demand for tool rigidity and break resistance which require a large core diameter.

High torsional and bending stiffness of an end mill is an advantage also in finishing and super finishing operations as a better surface finish is obtained.

During rough machining, the milling cutter is subjected to high torsion and bending as the machine tool drives the end mill shank while the teeth of the cutter in contact with the work piece encounter high resistance. An end mill with inadequate torsional and bending stiffness will vibrate angularly with high amplitude and not achieve high metal removal rates. Attempts to make deep cuts at high feed rates are liable to result in poor accuracy and surface quality, noise, and early breakage of the cutter.

Some examples of end mills are seen in U.S. Pat. Nos. 4,812,087; 5,188,487; 5,971,671; 6,231,275 B1 and the documents cited as references therein. Further examples of end mills according to the prior art are shown in FIGS. 1-4 in the present application.

OBJECT OR OBJECTS

It is therefore one of the objects of at least one possible embodiment of an end mill described herein to obviate the disadvantages of prior art end mills and to provide a cutter tooth form which has adequate chip clearance flute channels while providing improved torsional rigidity as well as improved bending resistance.

SUMMARY

The above object is achieved, according to at least one possible embodiment, by providing an end mill of outer diameter D configured for improved rigidity, comprising a body portion to be gripped by a machine tool and a cutting portion having a plurality of flutes machined to form cutting teeth adjacent to said flutes, the rear of each tooth comprising a short peripheral relief section starting at the cutting edge, and an arcuate extended-length tooth backing portion adjoining said peripheral relief section and ending in a corner formed between said extended length tooth backing portion and said flute, said corner being spaced from said outer diameter D by a distance C, the value of C being in the range 0 to 0.20D.

In another possible embodiment there is provided an end mill wherein a short concave blending radius connects said peripheral relief section to said arcuate extended-length tooth backing portion.

In yet another possible embodiment there is provided an end mill adapted for the machining of soft metals wherein the value C is about 0.06D or less and said corner acts to burnish the surface being machined.

Yet further possible embodiments will be described hereinafter.

The torsional stiffness J of a body subjected to torque, such as a shaft being twisted and a milling cutter while removing metal during cutting, is related not only to the cross-sectional area of the shaft, but also to the square of the distance each area is removed from the shaft center. The value J is calculated by summing up the various areas of which a section is composed, and multiplying each such area by the square of the distance r, which represents the distance between the centers of each area to the center of the profile.

J is usually referred to as the polar moment of inertia, the values of which can be given in $cm^4$.

Thus a shaft or a milling cutter subjected to torque can be stiffened by adding one or more areas to its cross-section to increase its J value.

Because the value r appears in the formula for calculating J as $r^2$, a very effective method of increasing J is to increase r by positioning the various area components comprising the cross-sectional area as far away from the center of twist as is possible. A simple illustration of this is found when a solid round shaft is replaced by a hollow cylinder or pipe of the same cross-sectional area and of the same weight, resulting in a much stiffer shaft due to the higher J value of the cylinder.

A glance at the diagrams presented in the present specification will make clear that the added areas which are a central feature of the present invention are quite large relative to the geometrical form of a prior-art milling cutter, and most importantly the extra areas are disposed in proximity to the outer diameter of the cutter.

While the extra areas on the rear face of the end mill teeth serve primarily to reduce torsional deflection while cutting, the additional benefit offered by the new design is in improved resistance to cantilever-type bending of the cutter when held by the machine at the shank end and pressed against the work-piece at the cutting end. As is well known, improved rigidity of the cutter improves the machined surface finish, improves the ability to machine to close tolerances, and with regard to roughing increases the possible metal removal rate, doing so while generating less vibration and less noise.

It will thus be realized that the cutting tool according to at least one possible embodiment serves to increase the J value essentially without reducing the size of the flute. By maintaining flute size, the flow of coolant to the cutting edges is not disturbed, and, more significantly, the discharge of chips from the cutting area through the flutes is virtually unobstructed.

At least one possible embodiment will now be described further with reference to the accompanying drawings, which represent by example possible embodiments. Structural details are shown only as far as necessary for a fundamental understanding thereof. The described examples, together with the drawings, will make apparent to those skilled in the art how further forms or possible embodiments may be realized.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
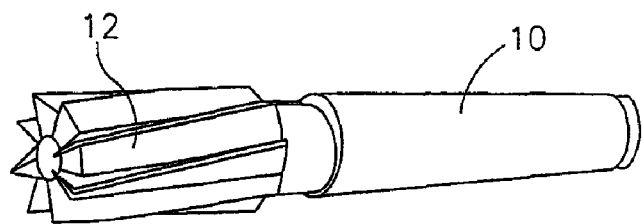
FIG. 1 is a perspective view of an end mill according to the prior art.

There is seen in FIG. 1 a prior art end mill having a shank or body portion 10 and a cutting portion 12. The end mill seen has 8 teeth and an outside diameter large enough (about 50-80 mm diameter) to allow chip clearance between teeth.

Figure 2:
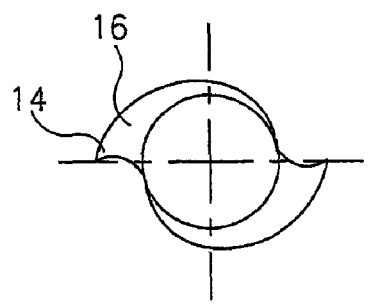
FIG. 2 is an end view of an end mill having 2 teeth according to the prior art.

The prior art cutter seen in FIG. 2 has two teeth 14, each tooth having a backing portion 16 which recedes to the core diameter 18 over about 160°. The C value is about 0.58.

Figure 3:
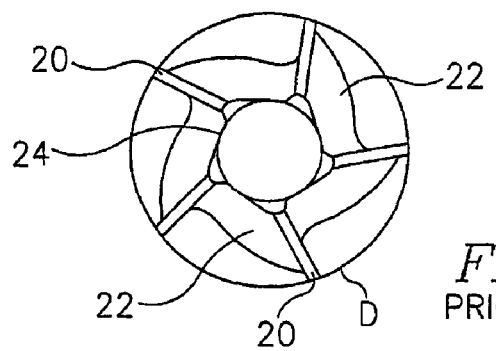
FIG. 3 is an end view of an end mill having 5 teeth according to the prior art.

The prior art end mill seen in FIG. 3 has 5 teeth 20, each having a backing portion 22 which recedes to a position about halfway between the core diameter 24 and the outside diameter D.

Figure 4:
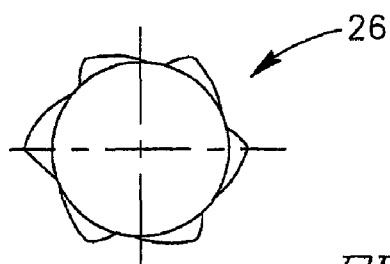
FIG. 4 is an end view of an end mill having 6 teeth according to the prior art.

FIG. 4 illustrates a prior art 6-tooth cutter 26. The tooth form 28 has a negative rake as it is intended to machine highly hardened steels, such as more than 55HRc steels (on the Rockwell scale of hardness), the tool 28 being made of sintered carbide.

Figure 5:
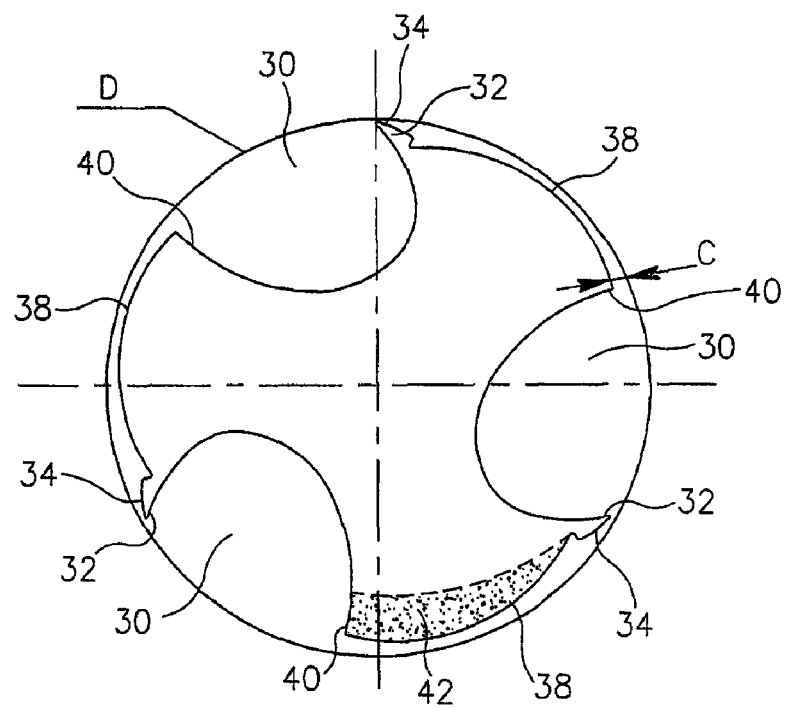
FIG. 5 is a view of an embodiment of the end mill according to at least one possible embodiment, showing the added material in the dotted area.

Turning now to FIG. 5, there is depicted a 3-tooth end mill configured for improved rigidity according to the present invention. The end mill comprises a body portion 10, seen in FIG. 7, to be gripped by a machine tool, and a cutting portion seen in the figure which has an outer diameter D. In at least one possible embodiment, the outer diameter D is the diameter of a reference circle defined by a radius R (see FIG. 10) extending from the central, rotational axis of the end mill to the outermost cutting edge.

Three flutes 30 are machined along the cutting portion to form cutting teeth 32 adjacent to said flutes. The rear of each tooth 32 comprises a short peripheral relief section 34 starting at the cutting edge. As described so far, the cutter accords with the prior art.

An arcuate extended-length tooth backing portion 38 adjoins the peripheral relief section 34 and ends in a corner or transition area 40 formed between the extended-length tooth backing portion 38 and the adjacent flute 30. The corner 40 is spaced from the outer diameter D by a distance C, the value of C being in the range 0 to 0.20D. For example, in a 16 mm diameter end mill C will be in the range 0 mm to 3.2 mm. It should be understood that the value of C could be 0D, 0.01D, 0.02D, 0.03D, 0.04D, 0.05D, 0.06D, 0.07D, 0.08D, 0.09D, 0.10D, 0.11D, 0.12D, 0.13D, 0.14D, 0.15D, 0.16D, 0.17D, 0.18D, 0.19D, or 0.20D, as well as values in thousandths in between.

In at least one other possible embodiment, the distance C can be measured with respect to a radius R of the reference circle, that is, half of the outer diameter D. The value of C would therefore be in the range of 0 to 0.40R. For example, in an end mill having a radius R of 8 mm, C will be in the range 0 mm to 3.2 mm. It should be understood that the value of C could be 0R, 0.01R, 0.02R, 0.03R, 0.04R, 0.05R, 0.06R, 0.07R, 0.08R, 0.09R, 0.10R, 0.11R, 0.12R, 0.13R, 0.14R, 0.15R, 0.16R, 0.17R, 0.18R, 0.19R, 0.20R, 0.21R, 0.22R, 0.23R, 0.24R, 0.25R, 0.26R, 0.27R, 0.28R, 0.29R, 0.30R, 0.31R, 0.32R, 0.33R, 0.34R, 0.35R, 0.36R, 0.37R, 0.38R, 0.39R, or 0.40R, as well as values in thousandths in between.

The low C values mean that substantially more material is available to rigidize the tooth. The extra material seen in the dotted area 42 is disposed far from the center of the end mill, and so greatly increases the torsional rigidity J of the tool, while also improving bending rigidity.

By choosing a moderate rake angle (0-8°), the end mill is readily configured for roughing applications, particularly for metals having a machinability rating below 40 on a scale where free-cutting brass has a machinability rating of 100 and 316 stainless steel has a rating of 10. The machinability rating is in accordance with the *Annual Book of ASTM Standards*, published by ASTM International, 100 Barr Harbor Drive, West Conshohocken, Pa., 19428-2959, which is incorporated by reference herein.

With reference to the rest of the figures, similar reference numerals have been used to identify similar parts.

Figure 6:
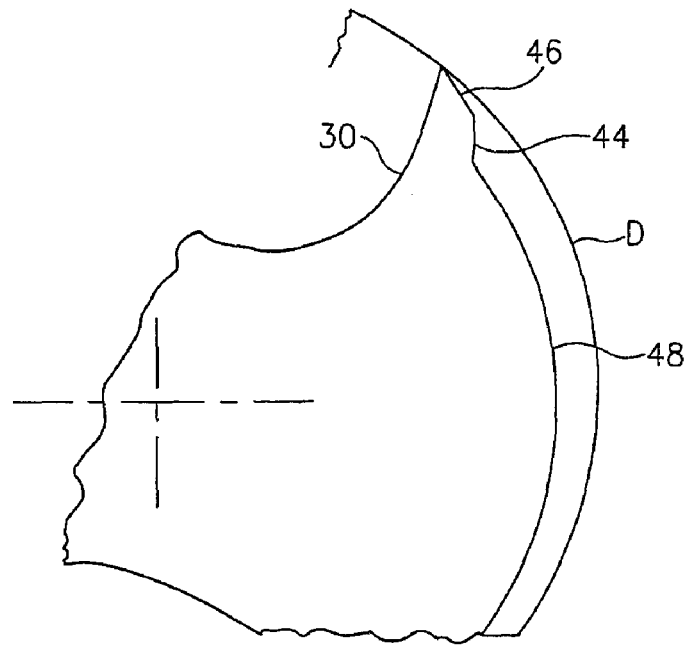
FIG. 6 is a detail view of the tooth form showing an intermediate blending radius.

FIG. 6 illustrates a detail of an end mill wherein a short concave blending radius 44 chamfer connects the peripheral relief section 46 to the arcuate extended-length tooth backing portion 48. The radius or chamfer 44 is helpful in preventing stress concentration when the cutter is in use.

Figure 7:
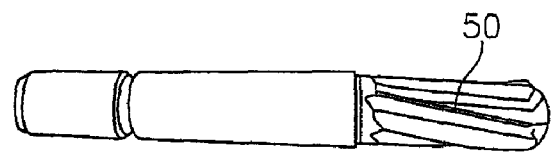
FIG. 7 is a perspective view of a ball nose end mill.
Figure 8:
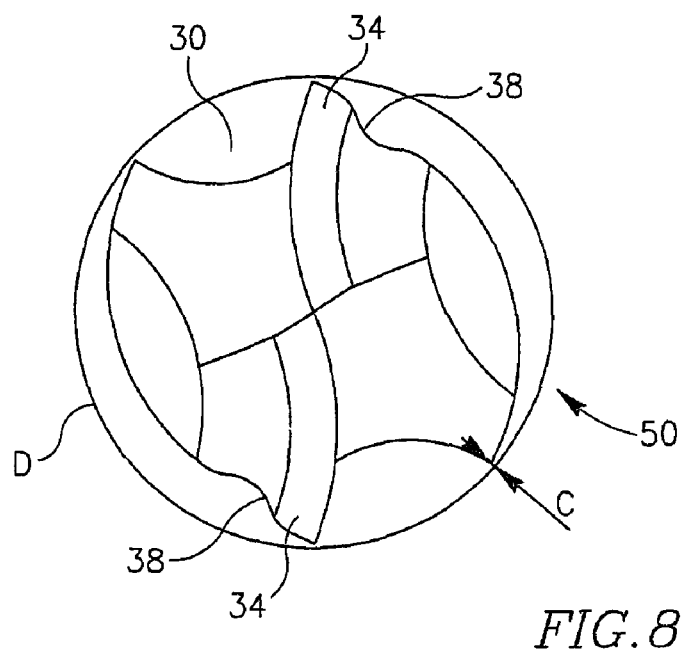
FIG. 8 is an end view of the ball nose end mill shown in FIG. 7.

Seen in FIGS. 7 and 8 is an end mill 50 formed as a ball-nose cutter. The end mill is otherwise similar to that described with reference to FIG. 5.

Figure 9:
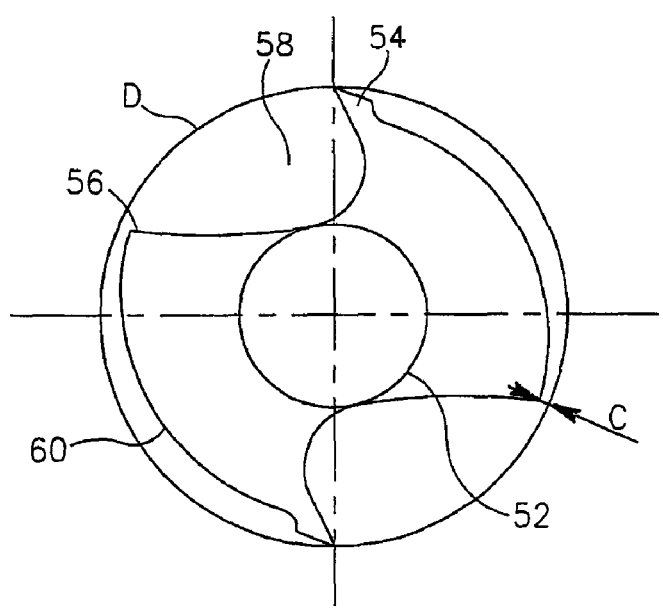
FIG. 9 is an end view of an end mill for milling soft metals and plastics.

Referring now to FIG. 9, there is depicted a further end mill according to the invention, being adapted for the machining of soft materials, such as free-cutting steel, non-ferrous metals and plastics. The value of C is about 0.03D, or 0.06R. The solid core 52 has a diameter of about 0.4D, or 0.8R.

The cutter has 2 teeth 54, each having rake angles of 10°-20°. The end mill is constructed of high speed steel, or solid carbide, or cermet, or ceramic.

Because of the low C value, the corner 56, between the flute 58 and the arcuate extended-length tooth backing portion 60, may contact the work piece and burnish the surface being machined.

Due to the extra material added at the back of the tooth, the end mill is break resistant even in the smaller sizes, and will generate less vibration and less noise than prior-art end mills of the same outside diameter. Thus higher metal removing rates can be achieved than were previously possible.

Figure 10:
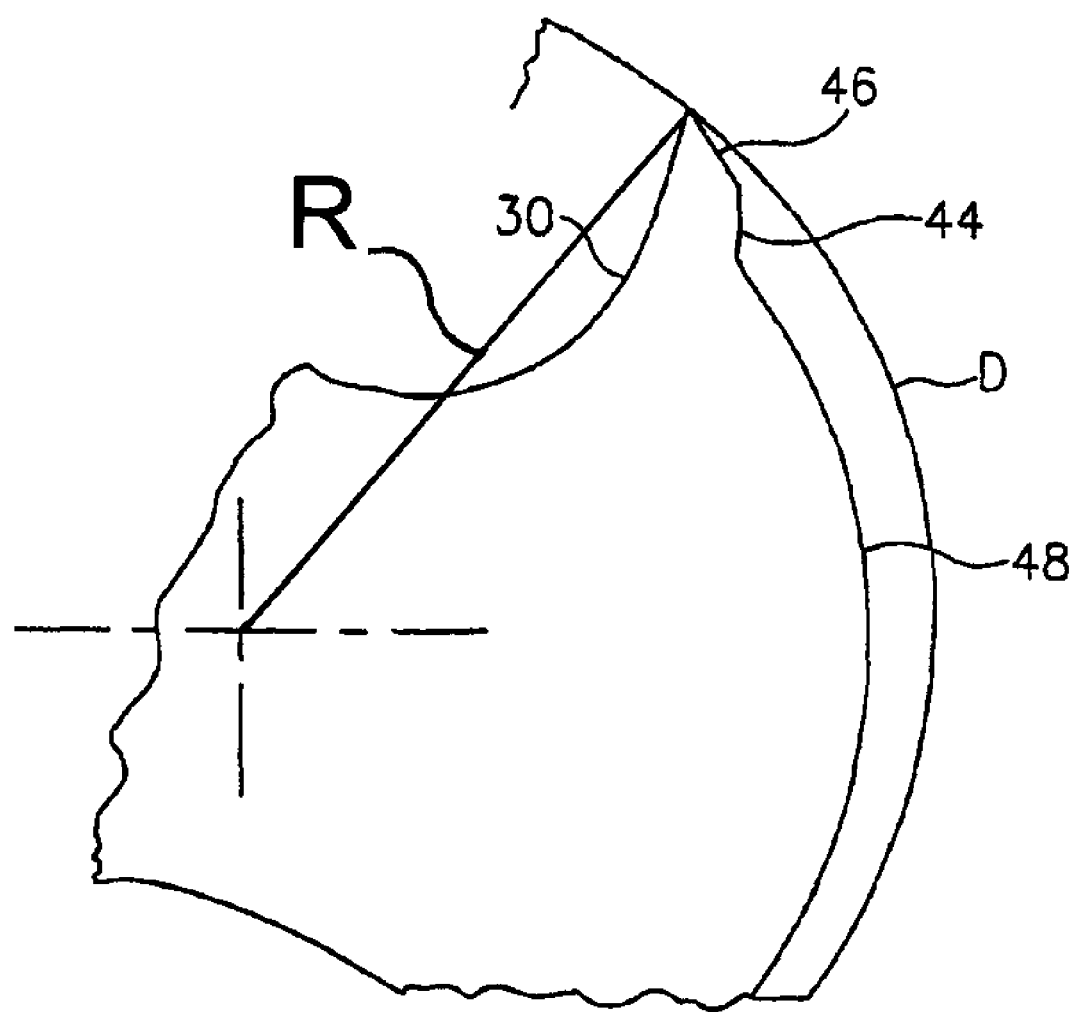
FIG. 10 is the detail view of the embodiment of the end mill according to FIG. 6, with additional detail.
Figure 11:
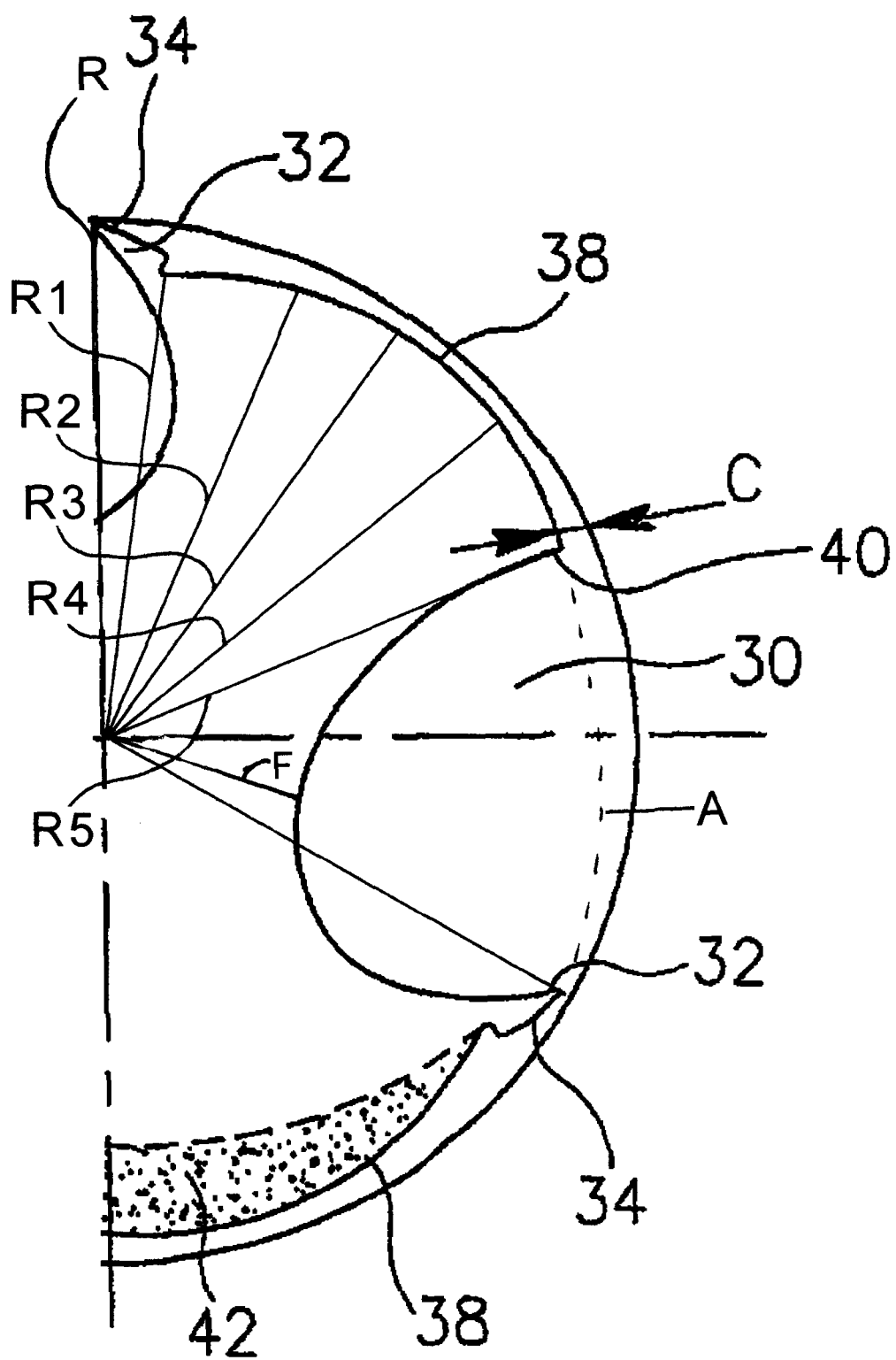
FIG. 11 is an expanded view of half of the end mill shown in FIG. 5 with additional detail.

FIG. 11 shows several radii R, R1, R2, R3, R4, and R5, each of which are measured from the central, rotational axis of the end mill. The radius R is shown in FIG. 10. Radius R1 is the distance to the first end of the arcuate extended-length tooth backing portion 38. Radius R5 is the distance to the opposite end or corner 40 of the arcuate extended-length tooth backing portion 38. Radii R2, R3, and R4 are the distances to various points along the arcuate extended-length tooth backing portion 38. Each of the radii R1, R2, R3, R4, and R5 are equidistant from one another along the arcuate extended-length tooth backing portion 38, but can be of different lengths, that is, different distances from the rotational axis.

According to at least one possible embodiment, the length of each of the radii R1, R2, R3, R4, and R5 is equal to or less than the length of the radius R. For example, the length of R5 can be in the range of 0.60R to 1.00R. The length of the radii R1, R2, R3, R4, and R5 therefore could be 0.60R, 0.61R, 0.62R, 0.63R, 0.64R, 0.65R, 0.66R, 0.67R, 0.68R, 0.69R, 0.70R, 0.71R, 0.72R, 0.73R, 0.74R, 0.75R, 0.76R, 0.77R, 0.78R, 0.79R, 0.80R, 0.81R, 0.82R, 0.83R, 0.84R, 0.85R, 0.86R, 0.87R, 0.88R, 0.89R, 0.90R, 0.91R, 0.92R, 0.93R, 0.94R, 0.95R, 0.96R, 0.97R, 0.98R, 0.99R, or 1.00R, as well as values in thousandths in between.

FIG. 11 also shows angle A, which is defined by the rotational axis and the two ends of the flute. Angle A as shown in FIG. 11 is approximately 60°, but in other possible embodiments could be in the range of 50°-70°. Specifically, angle A could be 50°, 51°, 52°, 53°, 54°, 55°, 56°, 57°, 58°, 59°, 60°, 61°, 62°, 63°, 64°, 65°, 66°, 67°, 68°, 69°, or 70°, as well as values in tenths of a degree in between.

FIG. 11 further shows distance F, which is the distance from the rotational axis to a point on the flute closest to the rotational axis. This distance F can also be measured relative to the radius R, and in FIG. 11 it is approximately 0.40R. Specifically, in at least one possible embodiment, distance F can be 0.30R, 0.31R, 0.32R, 0.33R, 0.34R, 0.35R, 0.36R, 0.37R, 0.38R, 0.39R, 0.40R, 0.41R, 0.42R, 0.43R, 0.44R, 0.45R, 0.46R, 0.47R, 0.48R, 0.49R, or 0.50R, as well as values in thousandths in between.

The scope of the described invention is intended to include at least all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

The invention relates to tools for the milling of materials. The invention provides improved torsional and bending rigidity of a tool's body in an end-mill, thereby to extend tool life while making possible machining at increased metal removal rates, and better surface quality, while preventing vibration. The end mill of outer diameter D configured for improved rigidity, comprising a body portion to be gripped by a machine tool and a cutting portion having a plurality of flutes machined to form cutting teeth adjacent to said flutes, the rear of each tooth comprising a short peripheral relief section starting at the cutting edge, and an arcuate extended-length tooth backing portion adjoining the peripheral relief section and ending in a corner formed between the extended length tooth backing portion and the flute, the corner being spaced from the outer diameter D by a distance C, the value of C being in the range 0 to 0.20D.

One feature or aspect of an embodiment is believed at the time of the filing of this patent application to possibly reside broadly in an end mill of outer diameter D configured for improved rigidity, comprising a body portion to be gripped by a machine tool and a cutting portion having a plurality of flutes machined to form cutting teeth adjacent to said flutes, the rear of each tooth comprising a short peripheral relief section starting at the cutting edge, and an arcuate extended-length tooth backing portion adjoining said peripheral relief section and ending in a corner formed between said extended length tooth backing portion and said flute, said corner being spaced from said outer diameter D by a distance C, the value of C being in the range 0 to 0.20D.

Another feature or aspect of an embodiment is believed at the time of the filing of this patent application to possibly reside broadly in an end mill, wherein a short concave blending radius or chamfer connects said peripheral relief section to said arcuate extended-length tooth backing portion.

Yet another feature or aspect of an embodiment is believed at the time of the filing of this patent application to possibly reside broadly in the end mill being a ball-nose cutter.

Still another feature or aspect of an embodiment is believed at the time of the filing of this patent application to possibly reside broadly in the end mill being adapted for the machining of soft metals, wherein the value C is about 0.06D or less and said corner acts to burnish the surface being machined.

A further feature or aspect of an embodiment is believed at the time of the filing of this patent application to possibly reside broadly in the end mill being configured for general applications.

Another feature or aspect of an embodiment is believed at the time of the filing of this patent application to possibly reside broadly in the end mill being configured for milling non-ferrous materials and plastics.

Yet another feature or aspect of an embodiment is believed at the time of the filing of this patent application to possibly reside broadly in the end mill being configured for roughing applications on metals having a machinability rating below 40 on a scale where free-cutting brass has a machinability rating of 100 and 316 stainless steel has a rating of 10.

A further feature or aspect of an embodiment is believed at the time of the filing of this patent application to possibly reside broadly in a soft-materials-cutting end mill being configured to rotate in a cutting direction about a central, rotational axis and cut soft materials such as free-cutting steel, non-ferrous metals, and plastics, said end mill comprising: a shaft portion being configured to be gripped by a tool; a cutting portion comprising a plurality of flutes and a plurality of cutting teeth; each pair of adjacent flutes of said plurality of flutes being configured and disposed to define a cutting tooth disposed therebetween; each of said cutting teeth comprising: a peripheral land surface being disposed to run substantially along the outermost periphery of said end mill from a leading flute disposed ahead of said peripheral land surface in the cutting direction to a trailing flute disposed behind said peripheral land surface in the cutting direction; a cutting edge being formed at the intersection of said land surface and said leading flute; a corner being formed at the intersection of said land surface and said trailing flute; said land surface comprising: a relief section extending from said cutting edge opposite the cutting direction; and an arcuate tooth-backing section extending opposite the cutting direction from said relief section to said corner; said tooth-backing section being substantially longer than said relief section; in a plane perpendicular to the rotational axis of said end mill, said corner being disposed a first distance from the rotational axis of said end mill and said cutting edge being disposed a second distance from the rotational axis of said end mill, which said first distance being in the range of sixty to one hundred percent of the amount of said second distance; and each of said flutes having a cross-sectional volume of sufficient size to provide both: (i) sufficient flow of chips during a cutting operation; and (ii) maximized size of said cutting teeth to extend a substantial portion of said cutting teeth and their corresponding land surfaces to at least said first distance from the rotational axis of said end mill to provide sufficient material adjacent the outer periphery of said end mill to both: (a) maximize the polar moment of inertia with respect to the rotational axis of said end mill and thus maximize the torsional rigidity of said end mill; and (b) maximize the resistance to bending of said end mill.

Another feature or aspect of an embodiment is believed at the time of the filing of this patent application to possibly reside broadly in a method of milling soft materials with a soft-materials-cutting end mill being configured to rotate in a cutting direction about a central, rotational axis and cut soft materials such as free-cutting steel, non-ferrous metals, and plastics, said end mill comprising: a shaft portion being configured to be gripped by a tool; a cutting portion comprising a plurality of flutes and a plurality of cutting teeth; each pair of adjacent flutes of said plurality of flutes being configured and disposed to define a cutting tooth disposed therebetween; each of said cutting teeth comprising: a peripheral land surface being disposed to run substantially along the outermost periphery of said end mill from a leading flute disposed ahead of said peripheral land surface in the cutting direction to a trailing flute disposed behind said peripheral land surface in the cutting direction; a cutting edge being formed at the intersection of said land surface and said leading flute; a corner being formed at the intersection of said land surface and said trailing flute; said land surface comprising: a relief section extending from said cutting edge opposite the cutting direction; and an arcuate tooth-backing section extending opposite the cutting direction from said relief section to said corner; said tooth-backing section being substantially longer than said relief section; in a plane perpendicular to the rotational axis of said end mill, said corner being disposed a first distance from the rotational axis of said end mill and said cutting edge being disposed a second distance from the rotational axis of said end mill, which said first distance being in the range of sixty to one hundred percent of the amount of said second distance; and each of said flutes having a cross-sectional volume of sufficient size to provide both: (i) sufficient flow of chips during a cutting operation; and (ii) maximized size of said cutting teeth to extend a substantial portion of said cutting teeth and their corresponding land surfaces to at least said first distance from the rotational axis of said end mill to provide sufficient material adjacent the outer periphery of said end mill to both: (a) maximize the polar moment of inertia with respect to the rotational axis of said end mill and thus maximize the torsional rigidity of said end mill; and (b) maximize the resistance to bending of said end mill; said method comprising the steps of: rotating said end mill; milling a work piece comprising soft material with said cutting teeth having a maximized size and thus minimizing vibration of said end mill and thus maximizing precision of the milling process; and removing chips of the soft material via said flutes having a sufficient size and thus maximizing chip flow and thus minimizing clogging of said flutes with chips and stoppages or interruptions of the milling process.

Still another feature or aspect of an embodiment is believed at the time of the filing of this patent application to possibly reside broadly in an end mill being configured to rotate in a cutting direction about a central, rotational axis, said end mill comprising: a shaft portion being configured to be gripped by a tool; a cutting portion comprising a plurality of flutes and a plurality of cutting teeth; each pair of adjacent flutes of said plurality of flutes being configured and disposed to define a cutting tooth disposed therebetween; each of said cutting teeth comprising: a peripheral land surface being disposed to run substantially along the outermost periphery of said end mill from a leading flute disposed ahead of said peripheral land surface in the cutting direction to a trailing flute disposed behind said peripheral land surface in the cutting direction; a cutting edge being formed at the intersection of said land surface and said leading flute; a transition area being formed at a transition between said land surface and said trailing flute; said land surface comprising: a first section extending from said cutting edge opposite the cutting direction; and a second section extending opposite the cutting direction from said first section to said transition area; in a plane perpendicular to the rotational axis of said end mill, said transition area being disposed a first distance from the rotational axis of said end mill and said cutting edge being disposed a second distance from the rotational axis of said end mill, which said first distance being in the range of sixty to one hundred percent of the amount of said second distance; and each of said flutes having a cross-sectional volume of sufficient size to provide both: (i) sufficient flow of chips during a cutting operation; and (ii) maximized size of said cutting teeth to extend a substantial portion of said cutting teeth and their corresponding land surfaces to at least said first distance from the rotational axis of said end mill.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Israeli Patent Application No. 162587, filed on Jun. 17, 2004, having inventor Vladimir VOLOKH, and International Application No. PCT/IL2005/000628, filed on Jun. 15, 2005, having WIPO Publication No. WO2005/122690 and inventor Vladimir VOLOKH, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in Israel and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A soft-materials-cutting end mill being configured to rotate in a cutting direction about a central, rotational axis and cut soft materials such as free-cutting steel, non-ferrous metals, and plastics, said end mill comprising:
   a shaft portion being configured to be gripped by a tool;
   a cutting portion comprising a plurality of flutes and a plurality of cutting teeth;
   each pair of adjacent flutes of said plurality of flutes being configured and disposed to define a cutting tooth disposed therebetween;
   each of said cutting teeth comprising:
      a peripheral land surface being disposed to run substantially along the outermost periphery of said end mill from a leading flute disposed ahead of said peripheral land surface in the cutting direction to a trailing flute disposed behind said peripheral land surface in the cutting direction;
      a cutting edge being formed at the intersection of said land surface and said leading flute;
      a corner being formed at the intersection of said land surface and said trailing flute;
      said land surface comprising:
         a relief section extending from said cutting edge opposite the cutting direction; and
         an arcuate tooth-backing section extending opposite the cutting direction from said relief section to said corner;
      said tooth-backing section being substantially longer than said relief section;
      in a plane perpendicular to the rotational axis of said end mill, said corner being disposed a first distance from the rotational axis of said end mill and said cutting edge being disposed a second distance from the rotational axis of said end mill, which said first distance being in the range of sixty to one hundred percent of the amount of said second distance; and
      each of said flutes having a cross-sectional volume of sufficient size to provide both:
         (i) sufficient flow of chips during a cutting operation; and
         (ii) maximized size of said cutting teeth to extend a substantial portion of said cutting teeth and their corresponding land surfaces to at least said first distance from the rotational axis of said end mill to provide sufficient material adjacent the outer periphery of said end mill to both:
            (a) maximize the polar moment of inertia with respect to the rotational axis of said end mill and thus maximize the torsional rigidity of said end mill; and
            (b) maximize the resistance to bending of said end mill.

2. The end mill according to claim 1, wherein a short concave blending radius or chamfer connects said peripheral relief section to said arcuate extended-length tooth backing portion.

3. The end mill according to claim 1, wherein said end mill comprises a ball-nose cutter.

4. The end mill according to claim 1, wherein:
   said first distance is approximately 94% or more of the amount of said second distance; and
   said corner acts to burnish the surface being cut.

5. A method of milling soft materials with a soft-materials-cutting end mill being configured to rotate in a cutting direction about a central, rotational axis and cut soft materials such as free-cutting steel, non-ferrous metals, and plastics, said end mill comprising: a shaft portion being configured to be gripped by a tool; a cutting portion comprising a plurality of flutes and a plurality of cutting teeth; each pair of adjacent flutes of said plurality of flutes being configured and disposed to define a cutting tooth disposed therebetween; each of said cutting teeth comprising: a peripheral land surface being disposed to run substantially along the outermost periphery of said end mill from a leading flute disposed ahead of said peripheral land surface in the cutting direction to a trailing flute disposed behind said peripheral land surface in the cutting direction; a cutting edge being formed at the intersection of said land surface and said leading flute; a corner being formed at the intersection of said land surface and said trailing flute; said land surface comprising: a relief section extending from said cutting edge opposite the cutting direction; and an arcuate tooth-backing section extending opposite the cutting direction from said relief section to said corner; said tooth-backing section being substantially longer than said relief section; in a plane perpendicular to the rotational axis of said end mill, said corner being disposed a first distance from the rotational axis of said end mill and said cutting edge being disposed a second distance from the rotational axis of said end mill, which said first distance being in the range of sixty to one hundred percent of the amount of said second distance; and each of said flutes having a cross-sectional volume of sufficient size to provide both: (i) sufficient flow of chips during a cutting operation; and (ii) maximized size of said cutting teeth to extend a substantial portion of said cutting teeth and their corresponding land surfaces to at least said first distance from the rotational axis of said end mill to provide sufficient material adjacent the outer periphery of said end mill to both: (a) maximize the polar moment of inertia with respect to the rotational axis of said end mill and thus maximize the torsional rigidity of said end mill; and (b) maximize the resistance to bending of said end mill; said method comprising the steps of:

rotating said end mill;
milling a work piece comprising soft material with said cutting teeth having a maximized size and thus minimizing vibration of said end mill and thus maximizing precision of the milling process; and
removing chips of the soft material via said flutes having a sufficient size and thus maximizing chip flow and thus minimizing clogging of said flutes with chips and stoppages or interruptions of the milling process.

6. The end mill according to claim 5, wherein a short concave blending radius or chamfer connects said peripheral relief section to said arcuate extended-length tooth backing portion.

7. The end mill according to claim 5, wherein said end mill comprises a ball-nose cutter.

8. The end mill according to claim 5, wherein: said first distance is approximately 94% or more of the amount of said second distance; and said corner acts to burnish the surface being cut, and said method comprises the step of:
burnishing the surface of the workpiece with said corner.

9. An end mill being configured to rotate in a cutting direction about a central, rotational axis, said end mill comprising:
a shaft portion being configured to be gripped by a tool;
a cutting portion comprising a plurality of flutes and a plurality of cutting teeth;
each pair of adjacent flutes of said plurality of flutes being configured and disposed to define a cutting tooth disposed therebetween;
each of said cutting teeth comprising:
a peripheral land surface being disposed to run substantially along the outermost periphery of said end mill from a leading flute disposed ahead of said peripheral land surface in the cutting direction to a trailing flute disposed behind said peripheral land surface in the cutting direction;
a cutting edge being formed at the intersection of said land surface and said leading flute;
a transition area being formed at a transition between said land surface and said trailing flute;
said land surface comprising:
a first section extending from said cutting edge opposite the cutting direction; and
a second section extending opposite the cutting direction from said first section to said transition area;
in a plane perpendicular to the rotational axis of said end mill, said transition area being disposed a first distance from the rotational axis of said end mill and said cutting edge being disposed a second distance from the rotational axis of said end mill, which said first distance being in the range of sixty to one hundred percent of the amount of said second distance; and
each of said flutes having a cross-sectional volume of sufficient size to provide both:
(i) sufficient flow of chips during a cutting operation; and
(ii) maximized size of said cutting teeth to extend a substantial portion of said cutting teeth and their corresponding land surfaces to at least said first distance from the rotational axis of said end mill.

10. The end mill according to claim 9, wherein one of (A), (B), (C), (D), (E), and (F):
(A) a short concave blending radius or chamfer connects said first section to said second section;
(B) said end mill comprises a ball-nose cutter;
(C) said first distance is approximately 94% or more of the amount of said second distance; and
said transition area acts to burnish the surface being cut;
(D) said end mill is configured for general applications;
(E) said end mill is configured for milling non-ferrous materials and plastics; and
(F) said end mill is configured for roughing applications on metals having a machinability rating below 40 on a scale where free-cutting brass has a machinability rating of 100 and 316 stainless steel has a rating of 10.

11. The end mill according to claim 9, wherein a short concave blending radius or chamfer connects said first section to said second section.

12. The end mill according to claim 9, wherein:
said first distance is approximately 94% or more of the amount of said second distance; and
said transition area acts to burnish the surface being cut.

13. The end mill according to claim 9, wherein said end mill comprises a ball-nose cutter.

14. The end mill according to claim 9, wherein said end mill is configured for general applications.

15. The end mill according to claim 9, wherein said end mill is configured for milling non-ferrous materials and plastics.

16. The end mill according to claim 9, wherein said end mill is configured for roughing applications on metals having a machinability rating below 40 on a scale where free-cutting brass has a machinability rating of 100 and 316 stainless steel has a rating of 10.

17. The end mill according to claim 11, wherein:
said first distance is approximately 94% or more of the amount of said second distance; and
said transition area acts to burnish the surface being cut.

18. The end mill according to claim 11, wherein:
said end mill comprises a ball nose cutter; and
said end mill is configured for general applications.

19. The end mill according to claim 11, wherein:
said end mill comprises a ball nose cutter; and
said end mill is configured for milling non-ferrous materials and plastics.

20. The end mill according to claim 11, wherein:
said end mill comprises a ball nose cutter; and
said end mill is configured for roughing applications on metals having a machinability rating below 40 on a scale where free-cutting brass has a machinability rating of 100 and 316 stainless steel has a rating of 10.

* * * * *